United States Patent [19]
Bard et al.

[11] Patent Number: 5,811,773
[45] Date of Patent: Sep. 22, 1998

[54] SCANNER WITH FLEXIBLE FLAT CABLE ELECTRICALLY CONNECTED TO LIGHT EMITTER

[75] Inventors: Simon Bard, Setauket; Yajun Li, Oakdale; Jerome Swartz, Old Field; Boris Metlitsky; Joseph Katz, both of Stony Brook; Askold Strat, Patchogue; Harold Charych, East Setauket, all of N.Y.

[73] Assignee: Symbol Technologies, Inc., Holtsville, N.Y.

[21] Appl. No.: 800,610

[22] Filed: Feb. 14, 1997

Related U.S. Application Data

[62] Division of Ser. No. 597,882, Feb. 7, 1996, Pat. No. 5,661,290, which is a division of Ser. No. 218,959, Mar. 28, 1994, Pat. No. 5,536,925, which is a division of Ser. No. 897,664, Jun. 12, 1992, Pat. No. 5,374,817, which is a continuation-in-part of Ser. No. 787,458, Nov. 4, 1991, abandoned, which is a continuation-in-part of Ser. No. 699,417, May 13, 1991, Pat. No. 5,191,197, which is a continuation-in-part of Ser. No. 193,265, May 11, 1988, Pat. No. 5,144,120.

[51] Int. Cl.⁶ ............................ G06K 7/10
[52] U.S. Cl. ................ 235/454; 235/470; 235/472; 359/214; 359/225
[58] Field of Search ............. 235/454, 462, 235/470, 472; 359/214, 225

[56] References Cited

U.S. PATENT DOCUMENTS

| | | | |
|---|---|---|---|
| 4,185,215 | 1/1980 | Montagu | 310/83 |
| 4,186,332 | 1/1980 | Montagu | 318/218 |
| 4,253,104 | 2/1981 | Paulsen | 346/145 |
| 4,329,606 | 5/1982 | Montagu | 310/71 |
| 4,370,613 | 1/1983 | Montagu | 324/154 R |
| 4,410,235 | 10/1983 | Klement et al. | 350/96.18 |
| 4,462,014 | 7/1984 | Montagu | 335/230 |
| 4,502,752 | 3/1985 | Montagu | 350/6.6 |
| 4,525,030 | 6/1985 | Montagu et al. | 350/255 |
| 4,528,533 | 7/1985 | Montagu | 335/230 |
| 4,632,501 | 12/1986 | Glynn | 350/6.6 |
| 4,655,543 | 4/1987 | Montagu | 350/6.6 |
| 4,673,876 | 6/1987 | Paulsen | 324/208 |
| 4,694,212 | 9/1987 | Montagu | 310/90 |
| 4,694,235 | 9/1987 | Flowers | 318/662 |
| 4,763,967 | 8/1988 | Schermer | 350/6.3 |
| 4,787,546 | 11/1988 | Bradbury | 226/91 |
| 4,797,749 | 1/1989 | Paulsen | 358/302 |
| 4,816,920 | 3/1989 | Paulsen | 358/285 |
| 4,830,496 | 5/1989 | Young | 356/363 |
| 4,874,215 | 10/1989 | Montagu | 350/6.6 |
| 4,878,721 | 11/1989 | Paulsen | 350/6.6 |
| 4,919,500 | 4/1990 | Paulsen | 350/6.6 |
| 4,959,568 | 9/1990 | Stokes | 310/51 |
| 5,048,904 | 9/1991 | Montagu | 359/202 |
| 5,097,354 | 3/1992 | Goto | 359/212 |
| 5,097,356 | 3/1992 | Paulsen | 359/214 |
| 5,099,386 | 3/1992 | Stokes et al. | 361/298 |
| 5,115,120 | 5/1992 | Eastman | 235/462 |
| 5,121,138 | 6/1992 | Schermer et al. | 346/108 |
| 5,123,024 | 6/1992 | Dowd et al. | 372/38 |
| 5,140,144 | 8/1992 | Shepard et al. | 235/462 X |
| 5,150,249 | 9/1992 | Montagu | 359/202 |
| 5,169,050 | 12/1992 | Montagu | 228/4.5 |
| 5,170,277 | 12/1992 | Bard et al. | 235/412 X |

(List continued on next page.)

FOREIGN PATENT DOCUMENTS

| | | |
|---|---|---|
| 0 005 557 | 11/1979 | European Pat. Off. . |
| 0 741 281 A1 | 11/1996 | European Pat. Off. . |

*Primary Examiner*—Donald T. Hajec
*Assistant Examiner*—Michael G. Lee
*Attorney, Agent, or Firm*—Kirschstein et al.

[57] ABSTRACT

To reduce the size and weight of an optical scanner, the present invention provides a mirrorless beam scanning unit. A flexible member, such as a multi-wire, flat, electrical cable is connected to the light emitter. Reciprocation of the light emitter during emission of light by the light emitter causes the light to scan a surface, such as a surface bearing a bar code label. The cable flexes during such reciprocation.

20 Claims, 3 Drawing Sheets

U.S. PATENT DOCUMENTS

| | | | |
|---|---|---|---|
| 5,225,770 | 7/1993 | Montagu | 324/146 |
| 5,225,923 | 7/1993 | Montagu | 359/199 |
| 5,235,180 | 8/1993 | Montagu | 250/231.13 |
| 5,237,444 | 8/1993 | Schermer | 359/202 |
| 5,300,756 | 4/1994 | Cordingley | 359/559 X |
| 5,329,103 | 7/1994 | Rando | 235/462 |
| 5,374,817 | 12/1994 | Bard et al. | 235/462 |
| 5,400,132 | 3/1995 | Trepagnier | 356/138 |
| 5,424,632 | 6/1995 | Montagu | 324/146 |
| 5,475,206 | 12/1995 | Reddersen et al. | 235/462 |
| 5,521,740 | 5/1996 | Brosens | 359/224 |
| 5,528,411 | 6/1996 | Burdenko | 359/214 |
| 5,537,109 | 7/1996 | Dowd | 340/870.37 |
| 5,576,741 | 11/1996 | Johnson et al. | 346/145 |
| 5,661,290 | 8/1997 | Bard et al. | 235/472 |

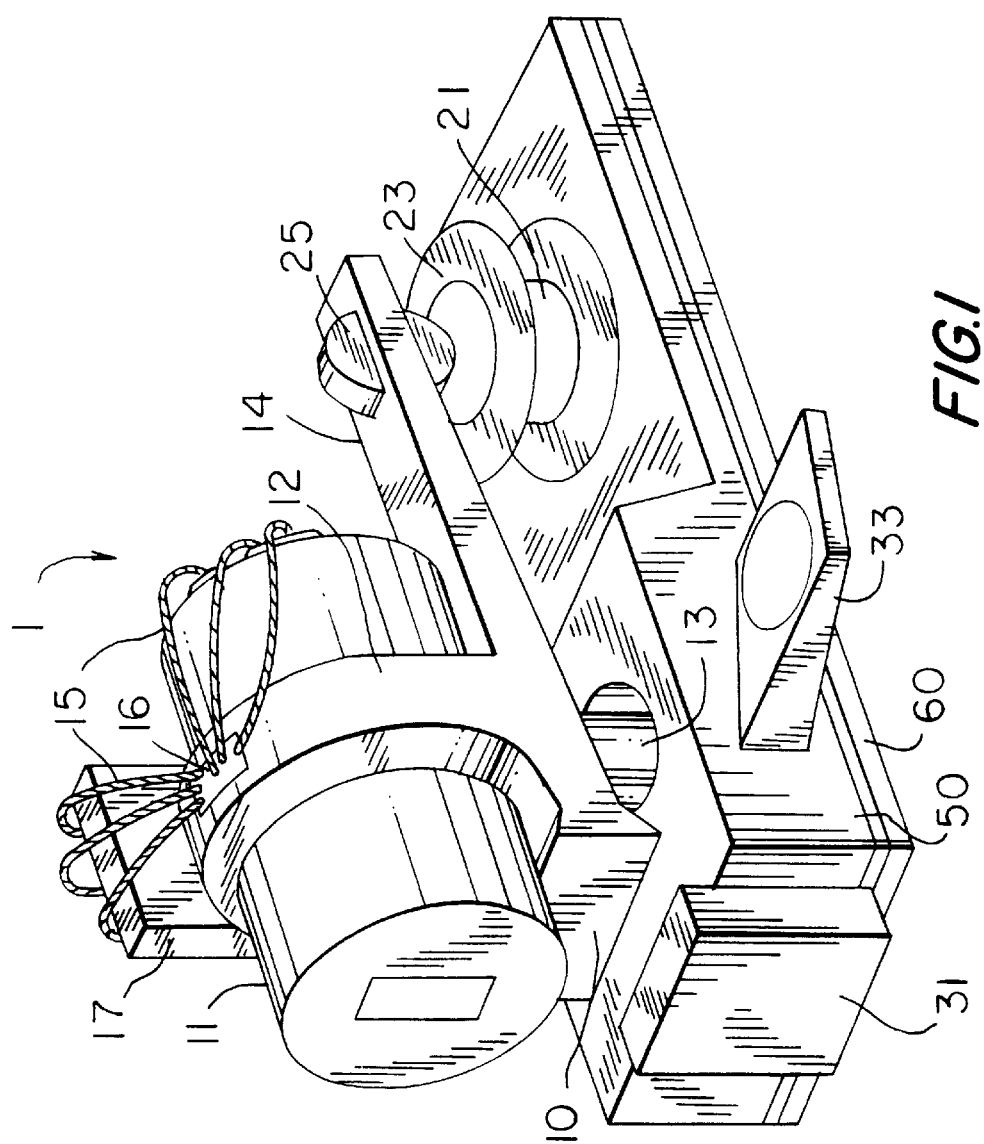

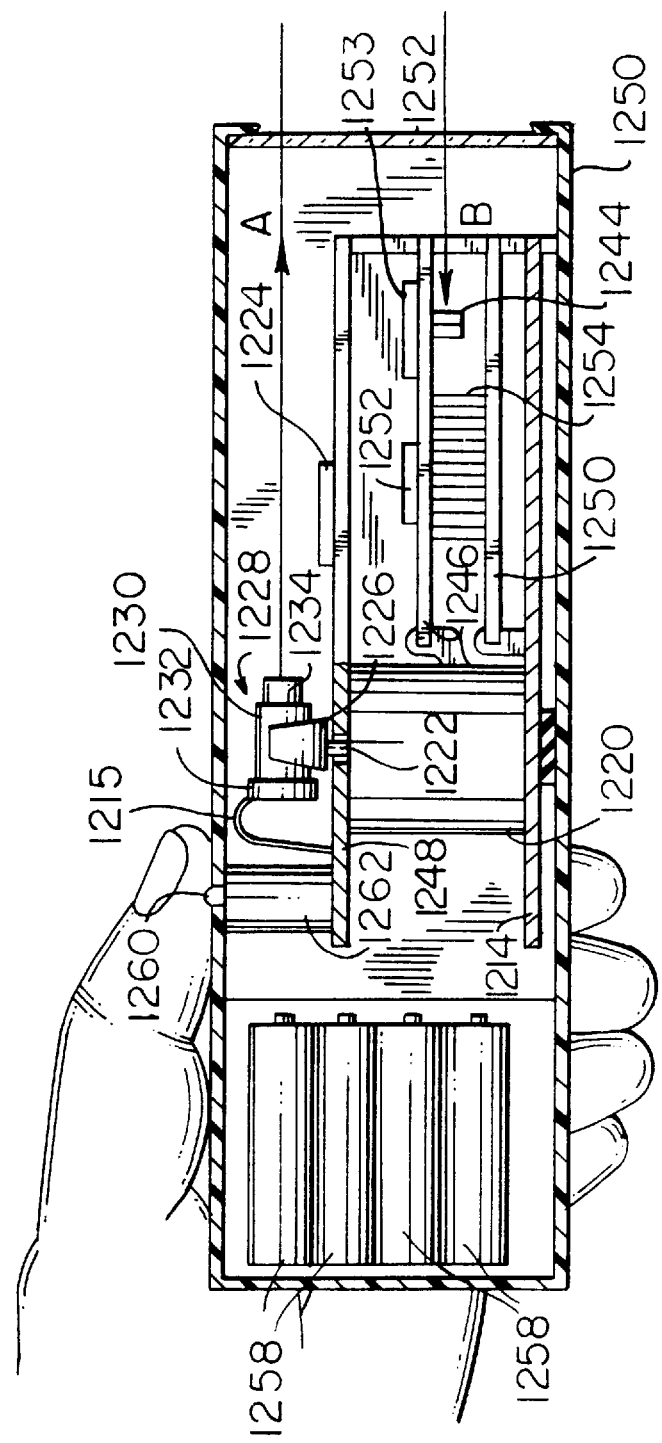

SCANNER WITH FLEXIBLE FLAT CABLE ELECTRICALLY CONNECTED TO LIGHT EMITTER

CROSS REFERENCE TO RELATED APPLICATIONS

This application is a division of application Ser. No. 08/597,882, filed Feb. 7, 1996, now U.S. Pat. No. 5,661,290, which is in turn a division of application Ser. No 08/218,959, filed Mar. 28, 1994, now U.S. Pat. No. 5,536,925, which is in turn a division of application Ser. No. 07/897,664, filed Jun. 12, 1992, now U.S. Pat. No. 5,374,817, which is in turn a continuation-in-part of application Ser. No. 07/787,458, filed Nov. 4, 1991, now abandoned, which is in turn a continuation-in-part of application Ser. No. 07/699,417, filed May 13, 1991, now U.S. Pat. No. 5,191,197, which is in turn a continuation-in-part of application Ser. No. 07/193,265, filed May 11, 1988, now U.S. Pat. No. 5,144,120, all of which are herein entirely incorporated by reference.

TECHNICAL FIELD

The present invention relates to optical scanners for optically reading information, such as bar codes. In particular, this invention relates to small light weight scanner structures which do not require a moving mirror to scan a light beam across the information.

BACKGROUND ART

Optical readers, such as bar code readers, are now quite common. Typically, a bar code comprises a series of encoded symbols, and each symbol consists of a series of light and dark regions, typically in the form of rectangles. The widths of the dark regions, the bars, and/or the widths of the light spaces between the bars indicate the encoded information. A bar code reader illuminates the code and senses light reflected from the code to detect the widths and spacings of the code symbols and derive the encoded data.

Bar code reading type data input systems improve the efficiency and accuracy of data input for a wide variety of applications. The ease of data input in such systems facilitates more frequent and detailed data input, for example to provide efficient inventories, tracking of work in progress, etc. To achieve these advantages, however, users or employees must be willing to consistently use the bar code readers. The readers therefore must be easy and convenient to operate.

A variety of scanning devices are known. One particularly advantageous type of reader is an optical scanner which scans a beam of light, such as a laser beam, across the symbols.

Laser scanner systems and components of the type exemplified by U.S. Pat. Nos. 4,251,798; 4,360,798; 4,369,361; 4,387,297; 4,593,186; 4,496,831; 4,409,470; 4,460,120; 4,607,156; 4,673,803; 4,736,095; 4,758,717; 4,816,660; 4,808,804; 4,816,661; 4,760,248; 4,871,904; 4,806,742; and 4,845,350, as well as U.S. application Ser. Nos. 07/148,669 and 07/147,708—all of these patents and patent applications being owned by the assignee of the instant invention—have generally been designed to read indicia having parts of different light reflectivity, e.g., bar code symbols, particularly of the Universal Product Code (UPC) type, at a certain working or reading distance from a hand-held or stationary scanner.

In a typical optical scanner system, a light source such as a laser generates a light beam which is optically modified to form a beam spot of a certain size at the working distance and is directed by optical components along a light path toward a bar code symbol located in the vicinity of the working distance for reflection from the symbol. A photodetector having a field of view extending across and slightly past the symbol detects light of variable intensity reflected off the symbol and generates electrical signals indicative of the detected light. A scanning component is situated in the light path. The scanning component may either sweep the beam spot across the symbol and trace a scan line across and past the symbol, or scan the field of view of the photodetector, or do both.

A digitizer, associated with or included in the scanner, processes the analog signal to produce a pulse signal where the widths and spacings between the pulses correspond to the widths of the bars and the spacings between the bars. The digitizer serves as an edge detector or wave shaper circuit, and the threshold value set by the digitizer determines what points of the analog signal represent bar edges. The pulse signal from the digitizer is applied to a decoder. The decoder first determines the pulse widths and spacings of the signal from the digitizer. The decoder then analyzes the widths and spacings to find and decode a legitimate bar code message. This includes analysis to recognize legitimate characters and sequences, as defined by the appropriate code standard. This may also include an initial recognition of the particular standard the scanned symbol conforms to. This recognition of the standard is typically referred to as autodiscrimination.

Often the particular application for the bar code reader requires that the optical scanner be constructed in the form of a handheld unit, typically in the form of a pistol. The user points the scanner at the object and operates a trigger to activate the scanning of the bar code. In these handheld units, a light source, such as a visible laser diode (hereinafter VLD) emits a beam of light. To scan the beam across an image, the beam is reflected from a mirror and the mirror is moved in an oscillatory fashion. The oscillation of the mirror causes the reflected beam to scan back and forth in a desired pattern. For example, U.S. Pat. No. 4,251,798 discloses a rotating polygon having a planar mirror at each side, each mirror tracing a scan line across the symbol. U.S. Pat. Nos. 4,387,297 and 4,409,470 both employ a planar mirror which is repetitively and reciprocally driven in alternate circumferential directions about a drive shaft on which the mirror is mounted. U.S. Pat. No. 4,816,660 discloses a multi-mirror construction composed of a generally concave mirror portion and a generally planar mirror portion. The multi-mirror construction is repetitively reciprocally driven in alternate circumferential directions about a drive shaft on which the multi-mirror construction is mounted.

In optical scanners of the type discussed above, the mirror and means to oscillate the mirror add size and weight to the handheld scanner. In applications involving protracted use, a large heavy handheld unit can produce fatigue. When use of the scanner produces fatigue or is in some way inconvenient, the user is reluctant to operate the scanner, which defeats the data gathering purposes for which bar code systems are intended.

Another problem with scanners of the type discussed above relates to the scan field and the size of the spot at the point where the beam impacts on the information. In scanning applications, such as reading bar codes, it is important to maintain the spot size of the beam on the scanned surface essentially at a constant across the entire length of the scanned information. Lasers emit a narrow core of radiation referred to as the laser beam. The beam cross-section varies as the laser beam propagates, particularly after focusing thereof by a lens. The minimum beam diameter is called the "beam waist." In the prior art, the scanning element, e.g. the moveable mirror, typically is positioned after the objective lens so as to scan the focused beam. Such scanning is referred to as "post objective" scanning. The objective lens in such scanners only needs to be slightly larger than the beam, and the scanning mirror can be somewhat smaller than the beam diameter. The mirror rotation, however, produces a curved or arcuate scan of the focal point of the beam. This curved scan field means that the focal point of the beam actually moves into and out of the plane of the information being scanned, and the part of the beam which impacts the plane of the information changes. Consequently, the spot size changes substantially from point to point along the scan line on the information surface. Such variations in spot size cause the intensity of light reflection sensed by the photodetector to vary, which may interfere with accurate sensing of reflection variations due to variations in the scanned information.

In non-laser scanning systems of the type exemplified by U.S. Pat. No. 4,578,571, a non-laser light emitting diode, an optical assembly, a photodetector, and electronic preamplifier/filter circuitry are all fixedly mounted on a common support that is connected to a cantilevered bimorph which is reciprocally driven to jointly move all the aforementioned components back and forth over a bar code symbol to be scanned. The large volume and heavy mass of all the commonly mounted non-laser system components require the expenditure of a great deal of power for the driver. This is not altogether practical in those cases, e.g. battery-powered operation, where power consumption is to be held to a minimum. Also, moving only one or more non-mirrored system components relative to another for conserving power was heretofore not considered desirable, because of optical alignment problems.

The components for the light scanning system, including the light source, optics, photo-detector, scanning component and an electrical conductor, can be mounted together in a common assembly to constitute a compact, lightweight, scan module. Such a scan module is mounted in an interchangeable, modular manner in housings of different configurations. For example, the housing can be hand-held and shaped as a cylinder in a so-called flashlight-type configuration, or shaped as a box, or shaped with a gun-like configuration. The housing can be mounted on the back of an operator's arm (see, for example, U.S. Pat. No. 4,766, 299) or on one or more fingers of the operator's hand, typically with the aid of a strap, a clip, or a glove. The housing can be mounted on a countertop workstation. The housing can be mounted in a mobile cart, or shopping cart, or, in some cases, even in a stationary installation.

Commonly assigned application Ser. No. 07/193,265 filed May 11, 1988 discloses a mirrorless optical scanner, and application Ser. No. 07/699,417 filed on May 13, 1991 discloses incorporation of such a scanner in a modular scanner component system facilitating use of the scanner in a variety of different housing configurations.

A need still exists, however, to further reduce the size and weight of the scanner unit and to provide a particularly convenient scanner system. The mass of the moving components should be as low as possible to minimize the power required to produce the scanning movement and to facilitate operation at high scanning speeds.

DISCLOSURE OF THE INVENTION

Objectives

The objective of this invention is to provide a scanner which is s smaller and lighter weight, particularly when held by an operator, and which is easier to manipulate to scan encoded data.

A further objective is to produce a durable robust scanning system at a relatively low cost.

To reduce weight and achieve a higher degree of miniaturization, it is a specific object of this invention to eliminate the mirror from the optical scanner.

Another objective of the invention is to reduce the mass of the components which actually move to scan the beam. This mass reduction reduces the power required to produce the movement and facilitates operation of the scanner at high scanning frequencies.

A further objective of the invention is to design the optics and scanning system to automatically compensate for variations in the beam spot size at the point the beam impacts on the surface of the optically encoded information due to the curved field produced by the motion of the scanning element.

In a different aspect, the invention provides a flat wire flexible cable to connect to a movably mounted light emitter. The light emitter can be one mounted for reciprocal movement in the manner discussed above. Alternately, the moveable light emitter could be a laser diode or the like mounted on the output shaft of a motor.

In a further aspect, the inventive scanning modules are incorporated into a scanning unit. The scanning unit includes one of the above discussed modules, to produce a moving beam for optically scanning a surface on which encoded indicia of varying reflectivity are formed. The scanning unit also includes a photodetector for sensing light reflected from the scanned surface and producing a proportional electrical signal.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

FIG. 1 is an isometric view of a first embodiment of the mirrorless scanner of the present invention, wherein the light emitter reciprocates.

FIG. 2 is a diagram showing the rotational arc of the emitter oscillation and the direction in which light is emitted.

FIG. 5 shows a show moving spot optical scanner for reading bar codes.

BEST MODE FOR CARRYING OUT THE INVENTION

Figure 3:
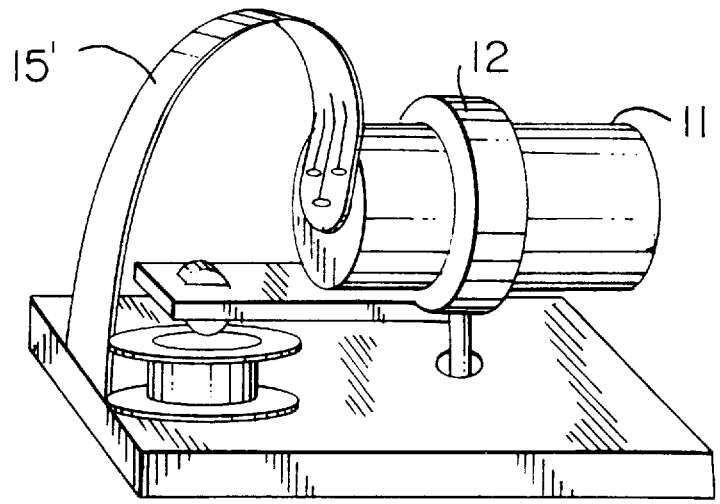
FIG. 3 shows an embodiment of the invention, similar to that of FIG. 1, using a flexible flat wire cable to provide the lead wire connection to the laser diode.

FIG. 1 depicts a mirrorless scanning unit 1 of the present invention. A light emitter, such as a visible laser diode or VLD 11, emits a beam of light to generate a scan line. The VLD 11 may be mounted on the pivotable shaft of a motor or on any material means capable of producing oscillating motion.

In the preferred embodiment of scanning unit 1, the VLD 11 is attached to the top end of a rotatable or pivotable shaft 13. The shaft 13 is pivotably mounted in a scanner base 50.

The shaft can be installed either on any known type of bearing or just to rotate in the plastic body of base 50. The VLD 11 and shaft 13 together form a moving assembly 10 for scanning the beam of light from the VLD type light emitter. The moving assembly 10 also includes a collar 12 and a lever arm 14 attached to the shaft 13. A force applied to the end of lever arm 14 produces the oscillatory movement of assembly 10, as will be discussed later.

The collar 12 secures the VLD 11 to the moving assembly 10. In the preferred embodiment, the VLD 11 is secured at a point atop of the shaft 13, such that the VLD 11 is effectively located on the pivot axis of the shaft 13 and aligned to emit light in a direction perpendicular to the axis of the shaft. Other arrangements of the VLD and shaft are possible. For example, the VLD could be located at a position offset from the axis. Also, the collar could support the VLD at an angle with respect to the shaft.

FIG. 2 illustrates the relationship of the motion and light emission of the VLD 11 to the axis of the shaft 13. The short rotational arc o about the shaft axis represents the back and forth pivotal oscillation of the VLD 11. The VLD 11 emits light in direction 1 toward a targeted object, such as a bar code (not shown). As the VLD 11 of assembly 10 oscillates back and forth through the small rotational arc o, the emitted light 1 will scan back and forth across the targeted image. Typically, the targeted image will be an indicia having varying reflective characteristics which represent information. For example, the image code comprises a series of bars, with spaces therebetween, which together form a bar code symbol.

As shown in FIG. 1, three thin wires 15 connect the leads of the VLD 11 on one side to a stationary holder 17 on the other. Alternatively, one flexible cable could be used. In the preferred embodiment, the wires 15 or cable are attached to an intermediate fixing point 16 atop the collar 12. The point 16 is located on the axis of the oscillation of moving assembly 10 and shaft 13 to minimize tension on the lead wires due to the zero linear speed at that point. Alternatively, the wires could be slack and hang loose or be coiled, so long as the wires provide a flexible connection to the oscillating VLD. In embodiments discussed later with respect to FIGS. 25 to 27, the wires comprise a flexible flat wire cable.

A variety of devices can be used to provide the force to oscillate the moving assembly 10 about the axis of shaft 13. In the illustrated embodiment, the oscillation of the assembly is provided by a so-called induced magnetization motor (hereinafter IMM).

The IMM type motor has been disclosed in commonly assigned application Ser. No. 07/520,464, filed on May 8, 1990, entitled SCANNING ARRANGEMENT, In that prior application the IMM oscillated a scanning mirror. In the IMM type motor, a restoring force is provided by the combination of a fixed position core and coil with a moveable permanent magnet. In embodiments using the flexible flat wire cable, the flat wire also provides a restoring force. If the permanent magnet is mounted on the end of a lever arm attached to a rotatable shaft, the force takes the form of a torque about the axis of the shaft.

In the present embodiment of the IMM, a core 21 comprises a bobbin around which the coil 23 is wound such that the core and coil are entirely concentric to minimize size and weight. The permanent magnet 25 is rigidly mounted at the end of the lever arm 14 of the moving assembly 10. Location of the permanent magnet 25 at a distance from the axis of the shaft 13 causes the magnetic force applied to the lever arm 14 through the permanent magnet 25 to produce a torque about the axis of the shaft 13.

The core 21 is made of a soft steel to prevent residual magnetization and is magnetically neutral in this case. When there is no current through the coil 23, axially magnetized permanent magnet 25, which is attached to the moving assembly through the lever arm, positions itself above the central axis of the core 21 by the attraction of the magnet 25 to the steel of the core 21. Thus, with no current flowing through coil 23, the moving assembly returns to its rest position at the center of its rotational arc, i.e. facing straight forward.

When a current is introduced through the coil 23, interaction between magnetic fields of the coil and the permanent magnet 25 causes the magnet (with the attached moving assembly) to move from an equilibrium position. As a result of such motion, however, the core becomes increasingly magnetized, thus creating a force (two unlike magnetic poles phenomena) which is trying to bring the permanent magnet 25 and the assembly 10 back to the rest position. The magnitude of this force depends on the amount of current through the coil 23, the airgap size between the permanent magnet 25 and a core surface, the size and the material of the core 21, etc. Reversing the polarity of the applied current will reverse the directions of the magnetic forces at work within the IMM. Therefore, if the current applied to the coil takes the form of a cyclical AC signal, such as a sign wave, a pulse signal, a triangular wave, etc., the induced magnetic forces will produce an oscillatory movement of the permanent magnet 25 and the attached moving assembly 10.

Although the IMM is preferred for the embodiment of FIG. 1, other arrangements could produce the necessary oscillatory motion. For example, the VLD 11 could be installed on the rotating shaft of a motor (see, e.g., FIG. 4). Also, if the IMM is used, other arrangements for mounting the VLD and connecting the moving assembly to the IMM are within the scope of the present invention. For example, in place of the shaft and lever arm arrangement shown in the drawings, the permanent magnet and VLD could both be mounted on a moveable or flexible bridge support directly over the bobbin coil so that the permanent magnet and VLD oscillate laterally together in response to the cyclical AC signal applied to the bobbin coil.

When used as a scanner for reading optically encoded information, such as a bar code, the scanner also includes a light detector, such as photodiode 31. As shown in FIG. 1, the front of the scanner base 50 supports photodiode 31 in a position and orientation whereby light from the VLD 11 reflected by a scanned image impinges on the light sensitive area of photodiode 31. The photodiode 31 receives an amount of light reflected back from the target, e.g. a bar code label, and converts that reflected light into an electrical current. A filter, pre-amplification and amplification stages may be provided on a printed circuit board 60 shown attached to the bottom of the scanner base 50. The pre-amplification and amplification stages convert a current from photodiode 31 into an electrical signal to be sent to digitizer and the rest of a processing circuitry contained in a separate unit.

A trigger button 33 is mounted on one side of the unit. A user operates button 33 to activate the unit.

In an embodiment actually built, the mirrorless scanning unit was only 1" long, by 1.25" high, by 0.625" wide. The exterior dimensions of a housing containing the mirrorless scanner are 1.1" long, by 1.4" high, by 0.7" wide. It takes only 13.5 mA and 3.5 V to operate the mirrorless scanner. Scan angle is +20°. Unit weight is less than one ounce (27.5 grams). Such a small scanner unit could easily be worn on a finger like an ordinary ring, leaving the operator's hands (including that finger) absolutely free.

The working range or decode zone can be changed by refocusing the VLD (for the beginning of the working range) and by the installation of a Fresnel lens in front of the photodiode or by using a photodiode with a larger sensitivity and active area.

FIG. 3 shows an embodiment of the invention, similar to that of FIG. 1. The embodiment of FIG. 3, however, replaces the wire leads with a flat flexible multi-wire cable 15', often referred to as a "flex-cable", to provide the lead wire connection to the visible laser diode VLD 11. Typically the "flex-cable" might comprise a flat strip of Kaptan material with wires embedded therein. The flexible multi-wire cable 15' provides a durable connection which is not susceptible to breakage due to repeated flexure during oscillation of the laser diode. Also, the multi-wire cable provides part or all of the restoring force necessary to operate the device.

The multi-wire cable can take any of a number of forms and will typically comprise a flexible flat wire cable. Any other flexible flat wire cable could be used so long as the structure provides sufficient flexibility.

Figure 4:
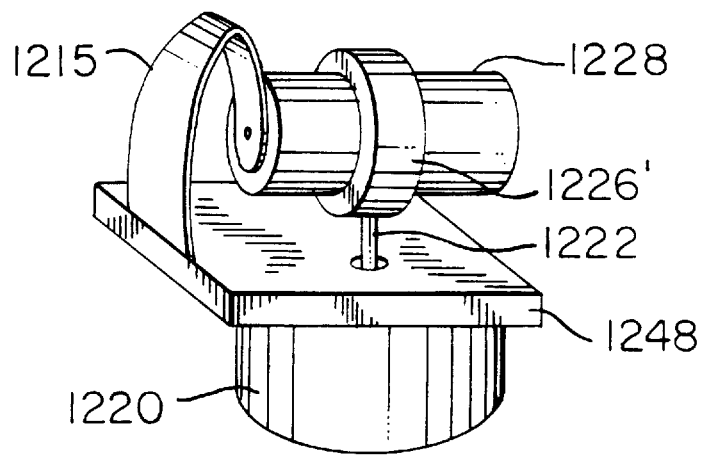
FIG. 4 shows another embodiment of the invention using a flexible flat wire cable to provide the lead wire connection to the laser diode.

FIG. 4 also shows an embodiment of the beam scanner module using a flexible flat wire cable and FIG. 5 illustrates a handheld bar code reader incorporating that beam scanner module. The handheld arrangement illustrated in FIG. 4 comprises a handheld housing 1250 containing a lightweight, high-speed, miniature scanning motor 1220 similar to that described in U.S. Pat. No. 4,496,831. In this bar code reader, the housing 1250 is cylindrical, like the housing of a flashlight or a ball point pen. Because of the small size of the scanning module and associated electronics, the housing 1250 may have a diameter of one inch or less.

A base 1214 supports the scanning motor 1220. A printed circuit board 1248 supports a switch 1262 actuated by depression of trigger 1260, and control circuitry 1224 for providing the drive signals necessary to operate the laser and to control operation of the motor. The output shaft 1222 of the motor 1220 extends through an opening in circuit board 1248. The motor 1220 repetitively drives output shaft 1222 in alternate circumferential directions over arc lengths less than 360° in each direction about an axis along which the shaft extends. U.S. Pat. No. 4,496,831 provides structural, functional and operational details of the motor 1220 and of the associated motor control circuitry 1224.

A U-shaped or circular support structure 1226 is mounted at the end of the shaft 1222 of motor 1220. FIG. 4, for example, shows a circular support 1226' surrounding the laser emitter and optics assembly 1228. A flexible flat wire cable 1215 electrically connects the laser emitter and optics assembly 1228 to circuit board 1248.

In the optical reader of FIG. 5, the U-shaped structure 1226 supports the laser emitter and optics assembly 1228. As the motor 1220, repetitively drives output shaft 1222 in alternate circumferential directions, the subassembly 1228 and the support structure 1226 jointly oscillate and turn with the shaft 1222.

The subassembly 1228 includes an elongated hollow tube 1230, a laser diode 1232 fixedly mounted at one axial end region of the tube 1230, and a lens barrel 1234 mounted at the opposite axial end region of the tube 1230. The lens barrel contains a focusing lens (not shown); and the lens barrel may provide an aperture stop, if necessary, to define the beam diameter and thereby the effective sensing spot of the scanner. The focusing lens is preferably a plano-convex lens, but may be spherical, convex or cylindrical. U.S. Pat. No. 4,816,660 describes the subassembly 1228 in detail. The solid state laser diode 1232, of the subassembly 1228, generates an incident laser beam, either in the invisible or visible light range. The lens focuses the laser beam such that the beam cross-section or beam spot will have a certain waist size at distances within a working range relative to the housing 1250. The focused beam passes along path A through the window 1252; and during the alternate, repetitive oscillations of the shaft 1222, as the support 1226 and the subassembly 1228 concurrently oscillate, the beam spot sweeps in an arc across the encoded information or bar code symbol.

A portion of the light reflected off the symbol passes along a return path B back through the window 1250 to a photodetector 1244. Photodetector 1244 senses the variable intensity of the returning portion of the reflected laser light and generates an electrical analog signal indicative of the detected variable light intensity. In the illustrated embodiment, the photodetector 1244 is stationarily mounted on the circuit board 1246, but could be mounted on the support structure 1226 for oscillation with the laser and optics subassembly 1228.

Printed circuit boards 1248 and 1250, on either side of the board 1246, contain signal processing circuitry 1252 and microprocessor circuitry 1253 for converting the analog electrical signal to a digital pulse signal and for deriving data representative of scanned bar code symbols from the digital pulse signal. A multi-wire cable 1254 electrically connects the signal processing circuitry and the microprocessor. Alternatively, in addition to the control circuitry 1224 for controlling operation of motor 1220 and the laser diode 1232, the printed circuit board 1248 may contain the signal processing circuitry and the microprocessor control circuitry. A battery pack 1258, mounted at the rear of housing 1250, supplies power for the scanning motor and all circuitry of the handheld bar code scanner arrangement.

To scan encoded information using the cylindrical handheld scanner, the user points the tip of the scanner at the information and activates the trigger button 1260. The laser diode 1232 emits a beam which scans the encoded information, and the photodetector 1244 outputs an analog electrical signal representative of any scanned symbols. A digitizer provided within signal processing circuitry 1252 processes the analog signal to produce a pulse signal where the widths and spacings between the pulses correspond to the widths of the bars and the spacings between the bars. The pulse signal from the digitizer is applied to the microprocessor 1253 for decoding. The microprocessor decoder first determines the pulse widths and spacings of the signal from the digitizer and then analyzes the widths and spacings to find and decode a legitimate bar code message. Typically, a cable carries the digital data representing the decoded characters to an associated computer or terminal (not shown).

Clearly, the mirrorless scanners of the present invention provide a particularly small, light weight, durable, optical scanner. By appropriate selection of focal length, deflection angle and distance between the lens and the information surface, the objective lens scanning automatically compensates for variations in beam spot size.

What is claimed is:

1. A scan module, comprising:
    an electrically energizeable light emitter for emitting light toward a surface to be scanned;
    a printed circuit board lying in a plane;
    a flexible member having at least two electrically conductive wires supported by the flexible member, each wire having one end electrically connected to the printed circuit board and an opposite end electrically connected to the light emitter for supplying electrical power thereto; and a drive for reciprocating the light emitter about an axis generally perpendicular to the plane of the printed circuit board and flexing the flexible member and the wires to sweep the light emitted by the light emitter across a portion of the surface.

2. The scan module according to claim 1, wherein the light emitter is a laser diode for emitting the light as a laser beam toward the surface on which a bar code symbol is present.

3. The scan module according to claim 1, wherein the flexible member includes a generally planar strip of resilient material.

4. The scan module according to claim 3, wherein the strip of resilient material has the wires embedded therein.

5. The scan module according to claim 1, wherein the flexible member is a generally planar, multi-wire cable.

6. The scan module according to claim 5, and wherein the light emitter has a rear wall, and wherein the cable has an opposite end secured to the rear wall of the light emitter.

7. The scan module according to claim 1, wherein the drive includes a drive shaft operatively connected to the light emitter, and a drive motor for oscillating the drive shaft in opposite circumferential directions of said axis.

8. The scan module according to claim 7, wherein the printed circuit board has an opening, and wherein the drive shaft extends through the opening.

9. The scan module according to claim 1; and further comprising a support shaft operatively connected to the light emitter for supporting the light emitter, and an electromagnetic assembly including an energizable coil and a permanent magnet for oscillating the support shaft in opposite circumferential directions of said axis.

10. The scan module according to claim 1, wherein the flexible member and the wires supported thereon extend along an arcuate course in a rest position of the flexible member.

11. A hand-held bar code reader, comprising:

a housing; and a scan module within the housing, the scan module including an electrically energizeable light emitter for emitting light toward a surface to be scanned, a printed circuit board lying in a plane, a flexible member having at least two electrically conductive wires supported by the flexible member, each wire having one end electrically connected to the printed circuit board and an opposite end electrically connected to the light emitter for supplying electrical power thereto, and a drive for reciprocating the light emitter about an axis generally perpendicular to the plane of the printed circuit board and flexing the flexible member and the wires to sweep the light emitted by the light emitter across a portion of the surface.

12. The reader according to claim 11, wherein the light emitter is a laser diode for emitting the light as a laser beam toward the surface on which a bar code symbol is present.

13. The reader according to claim 11, wherein the flexible member includes a generally planar strip of resilient material.

14. The reader according to claim 13, wherein the strip of resilient material has the wires embedded therein.

15. The reader according to claim 11, wherein the flexible member is a generally planar, multi-wire cable.

16. The reader according to claim 15, and wherein the light emitter has a rear wall, and wherein the cable has an opposite end secured to the rear wall of the light emitter.

17. The reader according to claim 11, wherein the drive includes a drive shaft operatively connected to the light emitter, and a drive motor for oscillating the drive shaft in opposite circumferential directions of said axis.

18. The reader according to claim 17, wherein the printed circuit board has an opening, and wherein the drive shaft extends through the opening.

19. The reader according to claim 11; and further comprising a support shaft operatively connected to the light emitter for supporting the light emitter, and an electromagnetic assembly including an energizable coil and a permanent magnet for oscillating the support shaft in opposite circumferential directions of said axis.

20. The reader according to claim 11, wherein the flexible member and the wires supported thereon extend along an arcuate course in a rest position of the flexible member.

* * * * *